US008262965B2

(12) United States Patent
Froeschner (10) Patent No.: US 8,262,965 B2
(45) Date of Patent: Sep. 11, 2012

(54) CURE GROWTH CONTROL APPARATUS

(75) Inventor: Neal A. Froeschner, Florissant, MO (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 13/025,760

(22) Filed: Feb. 11, 2011

(65) Prior Publication Data

US 2011/0151125 A1 Jun. 23, 2011

Related U.S. Application Data

(62) Division of application No. 11/971,387, filed on Jan. 9, 2008, now Pat. No. 7,909,597.

(51) Int. Cl.
*B29C 70/54* (2006.01)
*B29C 70/56* (2006.01)
*B29C 37/00* (2006.01)
*B05C 13/00* (2006.01)
*B05C 13/02* (2006.01)

(52) U.S. Cl. ............... 264/229; 264/219; 264/231

(58) Field of Classification Search ............... 264/219, 264/229, 231, 345, 347; 425/111, 340, 343, 425/383, 403, 446
See application file for complete search history.

(56) References Cited

U.S. PATENT DOCUMENTS

| 4,398,693 | A | * | 8/1983 | Hahn et al. | 249/155 |
| 4,882,118 | A | * | 11/1989 | Megarry | 264/510 |
| 6,814,563 | B2 | * | 11/2004 | Amnered et al. | 425/389 |
| 2007/0084967 | A1 | | 4/2007 | Polus | |

FOREIGN PATENT DOCUMENTS

EP 0 197 709 A 10/1986
WO WO 2006/070013 A 7/2006

OTHER PUBLICATIONS

Campbell, Flake C.; "Manufacturing Processes for Advanced Composites" pp. 104-131, Published by Elsevier Ltd., 2004, ISBN 1856174158.
European Patent Office (International Searching Authority) Search Report/Written Opinion mailed Apr. 3, 2009 for International Patent Application No. PCT/US2009/30491 International filing Date Jan. 8, 2009.

* cited by examiner

*Primary Examiner* — Richard Crispino
*Assistant Examiner* — Robert Dye
(74) *Attorney, Agent, or Firm* — Klintworth & Rozenblat IP LLC (57) ABSTRACT

An apparatus for curing a composite assembly may include a base tool, a growth control apparatus, and at least one engagement fitting. The base tool may have a different thermal expansion growth rate than a composite assembly to be cured using the apparatus. The growth control apparatus may have a different thermal expansion growth rate than the base tool. The engagement fitting may be moveably disposed relative to the base tool and connected to the growth control apparatus. The engagement fitting may hold a composite assembly being cured against the engagement fitting. The growth control apparatus may grow a pre-determined amount during curing of a composite assembly to produce a cured composite assembly having a pre-determined design dimension.

32 Claims, 5 Drawing Sheets

CURE GROWTH CONTROL APPARATUS

CROSS-REFERENCES TO RELATED APPLICATIONS

This application claims priority to and is a divisional of U.S. patent application Ser. No. 11/971,387 filed Jan. 9, 2008, which is hereby incorporated by reference.

BACKGROUND

Complex composite assemblies may contain multiple detail parts that may or may not have the same or even similar thermal characteristics. The elevated temperature cure cycles that must be carried out on these assemblies may cause mis-alignment or mis-location of the assembled details. The relative movement of the detail parts due to thermal growth may be significant. Similarly, the tooling used to process these parts may be constructed of yet a different material with its own unique thermal characteristics. Some current methods for dealing with thermal differential issues, as far as the tooling is concerned, may be to use a tooling material that has the same or similar thermal properties, and/or, compensate for the expected size differential at the process temperature. These "compensation" factors may allow the tool to attain the desired size at the chosen temperature. One limitation of this method may be that it only applies at one specific temperature, unless the tool design/tool material, coincidentally, possesses the exact same thermal property, which is unlikely. This method may not maintain sameness between the tooling at the part assembly throughout the heat cycle. This may mean that there will be some relative, undesirable movement of the assembled pieces during the heat-up and cool-down portion of the cure cycle. Additionally, materials that may be considered as having the same thermal growth as a composite assembly might be considerably more expensive than other materials that would otherwise be sufficient.

An apparatus and/or method for curing a composite assembly is needed to decrease one or more problems associated with one or more of the existing apparatus and/or methods.

SUMMARY

In one aspect of the disclosure, an apparatus for curing a composite assembly may include a base tool, a growth control apparatus, and at least one engagement fitting. The base tool may be configured to have a different thermal expansion growth rate than a composite assembly to be cured using the apparatus. The growth control apparatus may have a different thermal expansion growth rate than the base tool. The at least one engagement fitting may be moveably disposed relative to the base tool and connected to the growth control apparatus. The engagement fitting may be configured to hold a composite assembly being cured. The growth control apparatus may be configured to grow during curing of a composite assembly to produce a cured composite assembly.

In another aspect of the disclosure, a method for curing a composite assembly is disclosed. In one step, an apparatus may be provided comprising a base tool, a growth control apparatus having a different thermal expansion growth rate than the base tool, and at least one engagement fitting which may be moveable relative to the base tool. In another step, a composite assembly may be disposed against the base tool. The composite assembly may have a different thermal expansion growth rate than the base tool. In an additional step, the at least one engagement fitting may be disposed against the composite assembly. In still another step, one portion of the growth control apparatus may be connected to the base tool. In yet another step, another portion of the growth control apparatus may be connected to the at least one engagement fitting without connecting the another portion to the base tool. In another step, the composite assembly may be cured to grow the growth control apparatus a pre-determined amount to produce a cured composite assembly of a pre-determined design dimension.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
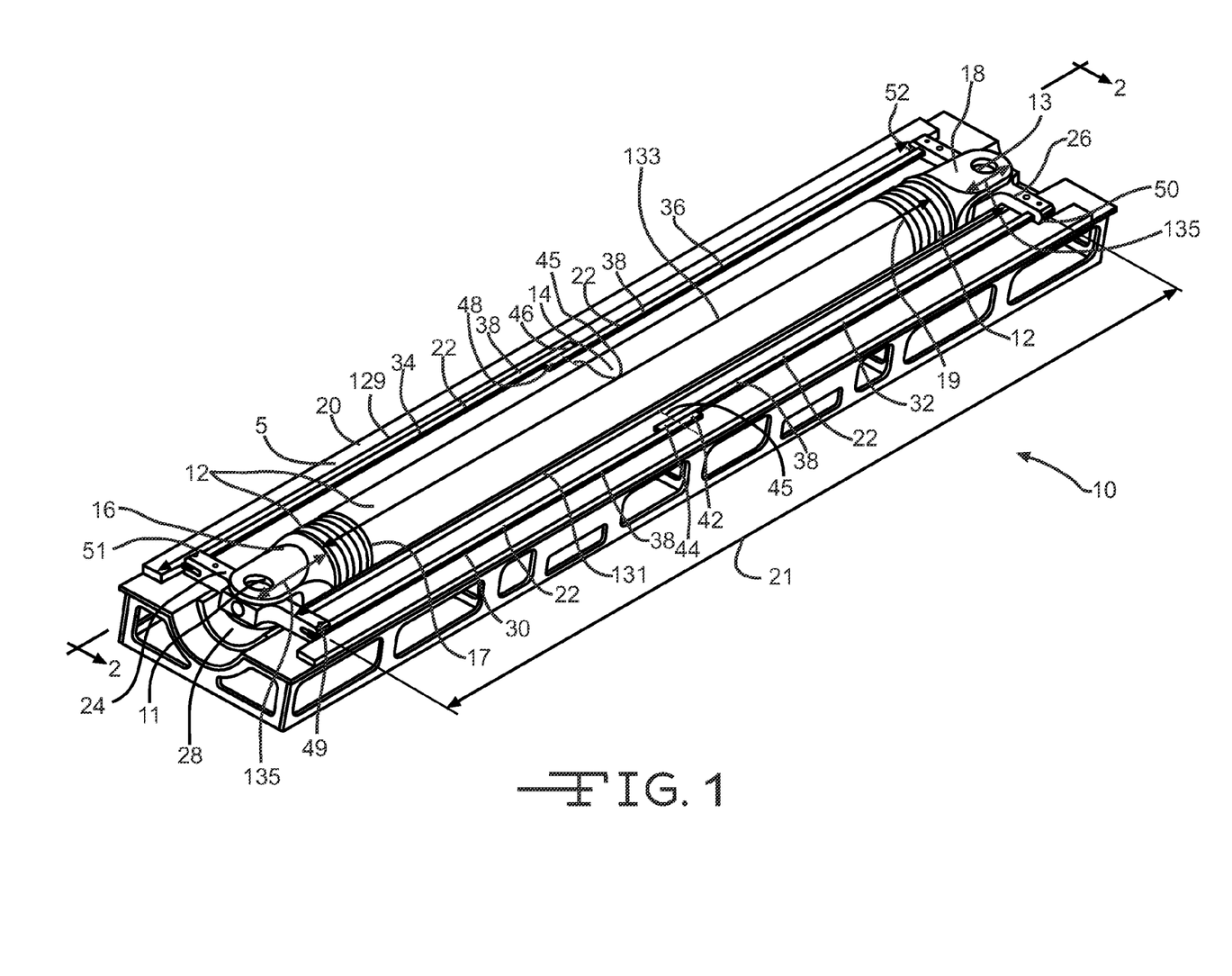
FIG. 1 shows a perspective view of an apparatus for curing a composite assembly.

FIG. 1 shows a perspective view of an apparatus 10 for curing a composite assembly 12. The apparatus 10 may be used to cure a composite assembly 12 comprising a composite tube 14, and a plurality of end fittings 16 and 18. The composite tube 14 may comprise a composite tube layup having any types of composite and/or non-composite materials known in the art. The end fittings 16 and 18 may be metallic and may be disposed freely against end portions 17 and 19 of the composite tube 14 in order to be co-bonded to the composite tube 14 during curing of the composite assembly 12.

The composite assembly 12 may comprise an aircraft part such as an aircraft skin or another portion of an aircraft. The composite assembly 12 may have a room temperature design dimension 21. The design dimension 21 may comprise a length of the composite assembly 12 extending between the end fittings 16 and 18. In other embodiments, the design dimension 21 may comprise a width and/or other dimension of the composite assembly 12. In other embodiments, the composite assembly 12 may comprise a non-aircraft device or structure. The apparatus 10 may comprise a base tool 20, a growth control apparatus 22, and engagement fittings 24 and 26. In other embodiments, the apparatus 10 may comprise any number, shape, size, type, and/or orientation of parts.

The base tool 20 may be made of a metal such as steel. In other embodiments, the base tool 20 may be made of varying materials. The base tool 20 may comprise a portion having a curved and/or contoured shape 28, and a portion which is substantially flat 5. The composite tube 14 and end fittings 16 and 18 resting against the composite tube 14 may be disposed within and/or against the contoured shape 28 of the base tool 20 without being connected to the base tool 20. The base tool 20 may have a different thermal expansion growth rate 29 than the thermal expansion growth rate 31 of the composite assembly 12.

The composite tube 14 may have a thermal expansion growth rate 33 which is different than the thermal expansion growth rate 35 of the end fittings 16 and 18. The thermal expansion growth rate 31 of the composite assembly 12 may comprise the overall collective thermal expansion rate of the composite assembly 12 taking into account both the thermal expansion growth rate 33 of the composite tube 14 and the thermal expansion growth rate 35 of the end fittings 16 and 18. The thermal expansion growth rate 29 of the base tool 20 may be larger than that of the thermal expansion growth rate 21 of the composite assembly 12. In other embodiments, the thermal expansion growth rates 29 and 31 of the base tool 20 and the composite assembly 12 may vary.

The engagement fittings 24 and 26 may be hat-shaped, and/or configured to match the shape of the end fittings 16 and 18, and may be attached at locations 11 and 13, using pins, clips, and/or other attachment mechanisms, to the end fittings 16 and 18 of the composite assembly 12, but may not be directly attached to the base tool 20. In other embodiments, the engagement fittings 24 and 26 may be of any number, shape, size, material, and/or may be attached to any portion of the composite assembly 12.

The growth control apparatus 22 may comprise a plurality of growth control members 30, 32, 34, and 36 which may be substantially smaller than the base tool 20. The growth control apparatus 22, including growth control members 30, 32, 34, and 36, may be made of Invar and/or another material which has a thermal expansion growth rate 38 which is different than the thermal expansion growth rate 31 of the composite assembly 12 and than the thermal expansion growth rate 29 of the base tool 20. In one embodiment, the thermal expansion growth rate 38 of the growth control apparatus 22 may be slightly greater than the thermal expansion growth rate 31 of the composite assembly 12, and substantially smaller than the thermal expansion growth rate 29 of the base tool 20. In other embodiments, the growth control apparatus 22 may be made of varying materials and/or have varying thermal expansion growth rates 38 relative to the thermal expansion growth rates 29 and 31 of the base tool 20 and the composite assembly 12. The growth control members 30, 32, 34, and 36 may be disposed in offset formation relative to one another to account for differences in the thermal expansion growth rate 38 of the growth control apparatus 22 relative to the thermal expansion growth rate 31 of the composite assembly 12.

Growth control members 30, 32, 34, and 36 may be pinned at respective ends 42, 44, 46, and 48 to base tool 20. The pinned ends 42, 44, 46, and 48 may be offset from a center location/center-line 45 of the composite assembly 12 in order to account for differences in the thermal expansion growth rate 38 of the growth control apparatus 22 relative to the thermal expansion growth rate 31 of the composite assembly 12. The other respective ends 49, 50, 51, and 52 of growth control members 30, 32, 34, and 36 may be pinned to engagement fittings 24 and 26, but not to base tool 20. In such manner, the engagement fittings 24 and 26 may be configured to hold the composite assembly 12 between and/or against the engagement fittings 24 and 26 during curing of the composite assembly 12. Moreover, as a result of the engagement fittings 24 and 26 not being directly attached to the base tool 20, the engagement fittings 24 and 26 may be moveably disposed relative to the base tool 20 with growth and/or movement of ends 49, 50, 51, and 52 of growth control members 30, 32, 34, and 36.

Figure 2:
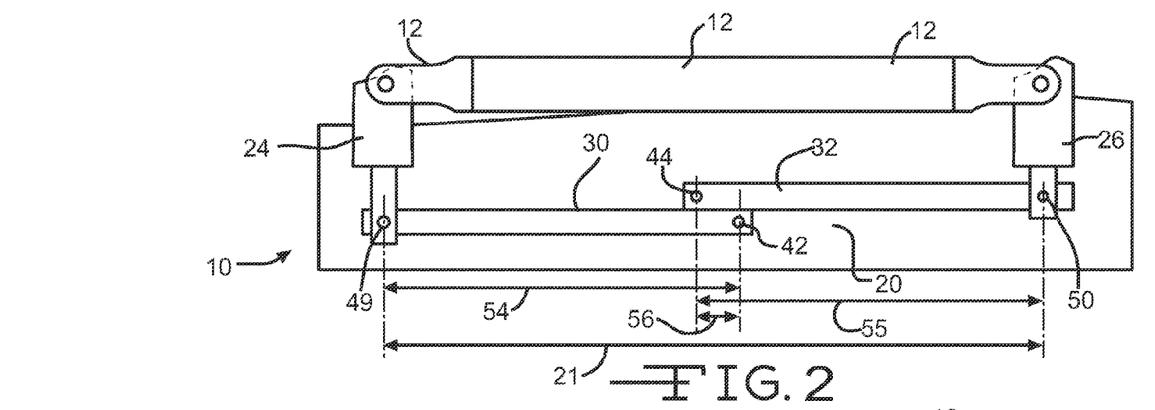
FIG. 2 shows an enlarged partial top view along line 2-2 of the apparatus of FIG. 1.

FIG. 2 shows an enlarged partial top view along line 2-2 of the apparatus 10 of FIG. 1 prior to the composite assembly 12 being cured. As shown, the design dimension 21 of the composite assembly 12 prior to being cured may comprise the distance extending between the ends 49 and 50 of growth control members 30 and 32 which are pinned to engagement fittings 24 and 26. Distance 54 may comprise the distance extending between end 49 of growth control member 30 which may be attached to engagement fitting 24 and end 42 of growth control member 30 which may be attached to base tool 20. Distance 55 may comprise the distance extending between end 50 of growth control member 32 which may be attached to engagement fitting 26 and end 44 of growth control member 32 which may be attached to base tool 20. Distance 56 may comprise the offset distance between end 42 of growth control member 30 which may be attached to base tool 20 and end 44 of growth control member 32 which may be attached to base tool 20.

The design dimension 21 of the composite assembly 12 may be determined by adding distance 54 to distance 55 and subtracting offset distance 56. It should be noted that the other side of the apparatus 10 which is not shown by FIG. 2 may be exactly and/or substantially proportional to the side of the apparatus 10 shown by FIG. 2, and the respective distances and calculations may be exactly and/or substantially identical to the side shown.

Figure 3:
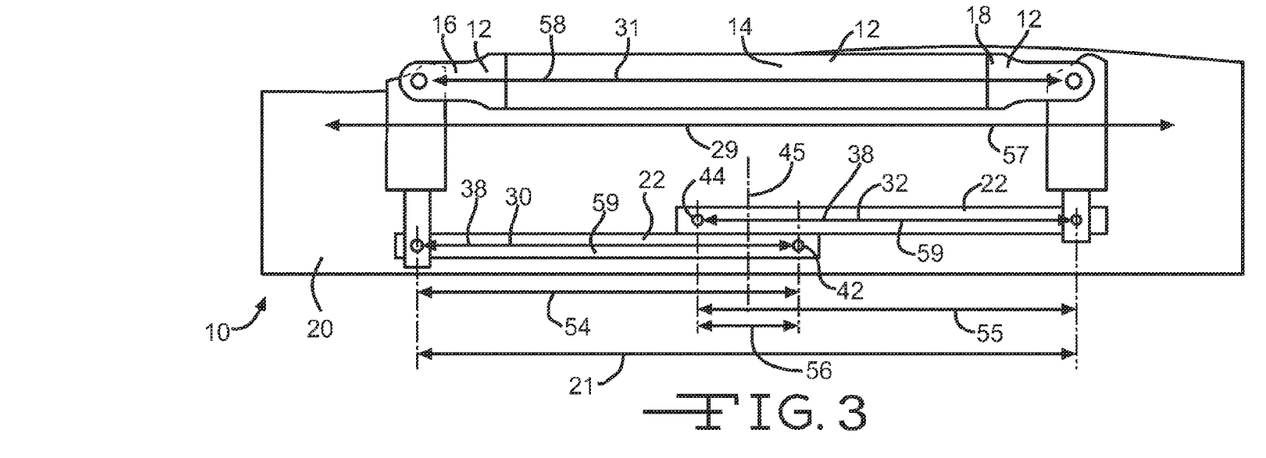
FIG. 3 shows an enlarged partial top view of the apparatus of FIG. 2 after the composite assembly has been cured at an elevated curing temperature.

FIG. 3 shows an enlarged partial top view of the apparatus 10 of FIG. 2 after the composite assembly 12 has been cured at an elevated curing temperature during which the end fittings 16 and 18 may have been bonded/cured to the composite tube 14. Due to the elevated curing temperature, the base tool 20 may have expanded along direction 57 in conjunction with the thermal expansion growth rate 29 of the base tool 20. Similarly, the composite assembly 12 may have expanded in direction 58 in conjunction with the thermal expansion growth rate 31 of the composite assembly 12. Likewise, each of the growth control members 30, 32 may have expanded in substantially equal amounts in direction 59, and/or parallel to it, in conjunction with the thermal expansion growth rate 38 of the growth control members 30 and 32. Although the growth control members 34 and 36 are not shown in FIG. 3, their growth may have been substantially equal to the growth of growth control members 30 and 32 in direction 59 and/or parallel to it in conjunction with the thermal expansion growth rate 38 of the growth control members 30 and 32. Due to the differences in the thermal expansion growth rates 29, 31, and 38, the base tool 20, composite assembly 12, and growth control apparatus 22 may have expanded varying amounts in respective directions 57, 58, and 59. As a result, the design dimension 21, and distances 54, 55, and 56 shown in the cured composite assembly 12 and apparatus 10 of FIG. 3 may all be larger than the respective design dimension 21 and respective distances 54, 55, and 56 shown in the uncured composite assembly 12 and apparatus 10 of FIG. 2.

Since the design dimension 21 of the cured composite assembly 12 of FIG. 3 may be determined by adding distance 54 to distance 55 and subtracting offset distance 56, as a result of the offset distance 56, the cured composite assembly 12 may obtain a design dimension 21 of a pre-determined amount despite the growth control apparatus 22 thermally growing a varying amount relative to the base tool 20 and the composite assembly 12. In such manner, by offsetting the members 30, 32, 34, and 36 of the growth control apparatus 22 relative to the center-line 45 of the composite assembly 12 by a pre-determined amount, the growth apparatus 22 may grow a pre-determined overall amount to produce a pre-determined design dimension 21 of the cured composite assembly 12.

By varying the materials of the base tool 20, the composite assembly 12, and the growth control apparatus 22 to obtain varying thermal expansion growth rates 29, 31, and 38, and/or by varying the distances 54, 55, and 56, a varying cured pre-determined design dimension 21 may be produced. In still another embodiment, the ends 42, 44, 46, and 48 of the growth control members 30, 32, 34, and 36 which are attached to the base tool 20 may each be offset to opposite respective sides of the center-line 45 of the composite assembly 12 in order for the offset distance 56 to have an additive effect on the design dimension 21 rather than a subtractive effect as shown in the example.

Figure 4:
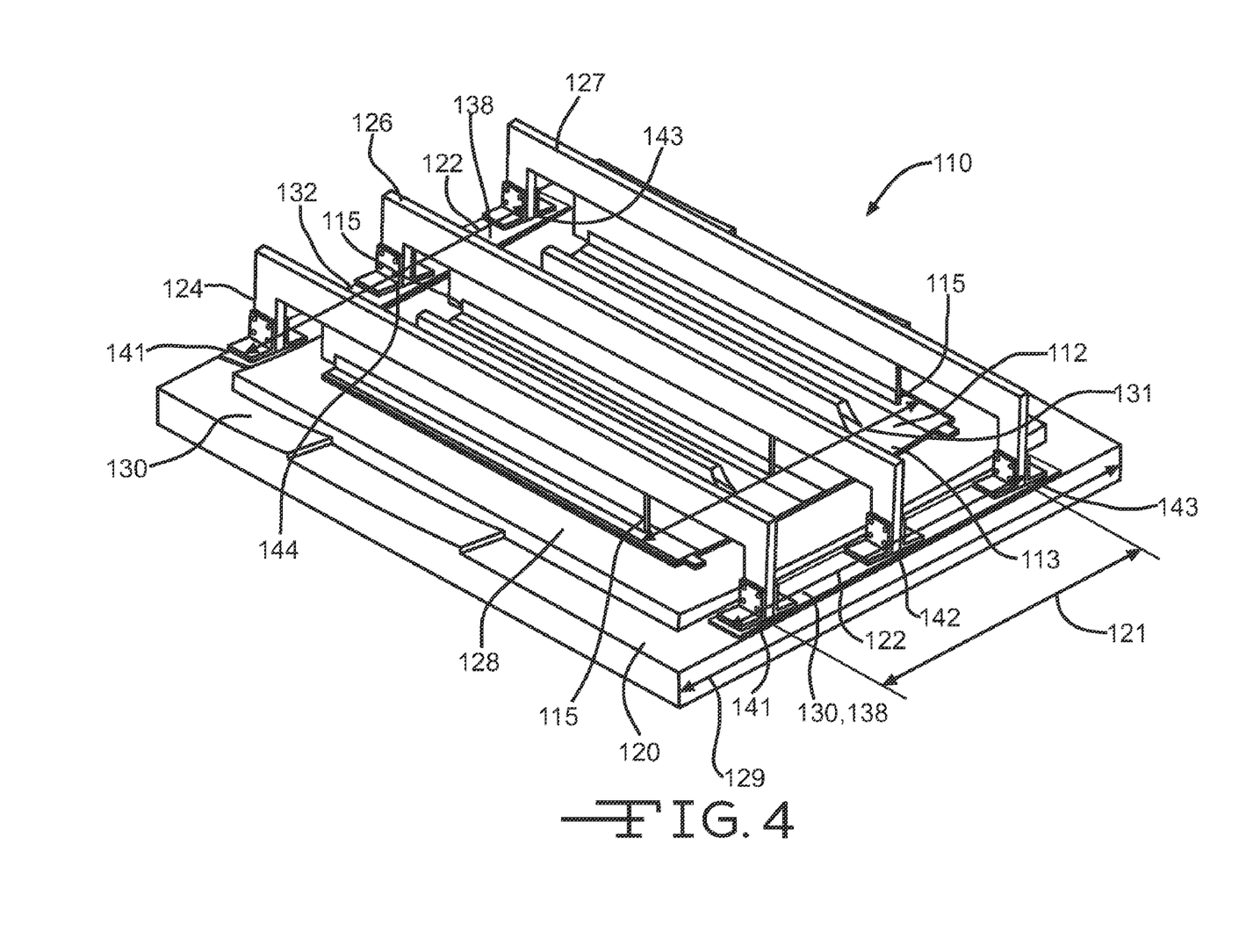
FIG. 4 shows a perspective view of another apparatus for curing a composite assembly.

FIG. 4 shows a perspective view of another apparatus 110 for curing a composite assembly 112. The apparatus 110 may be used to cure a composite assembly 112 comprising composite part 113 and composite parts 115. The composite part 113 may comprise an aircraft part, an aircraft skin, or a non-aircraft part, while composite parts 115 may comprise composite clips which may be T-shaped. Composite parts 115 may be freely disposed against the composite part 113 to be co-cured/co-bonded. The composite assembly 112 may be made of any type of composite and/or non-composite materials known in the art. The composite assembly 112 may have a room temperature design dimension 121.

The design dimension 121 may comprise a width of the composite assembly 112 extending between the end two composite parts 115. In other embodiments, the design dimension 121 may comprise a length and/or other dimension of the composite assembly 112. The apparatus 110 may comprise a base tool 120, a growth control apparatus 122, and engagement fittings 124, 126, and 127. In other embodiments, the apparatus 110 may comprise any number, shape, size, type, and/or orientation of parts.

The base tool 120 may be made of a metal such as steel. In other embodiments, the base tool 120 may be made of varying materials. The base tool 120 may comprise a raised contoured portion 128, and a lowered flat portion 130. The composite assembly 112 may be disposed against the base tool 120 without being connected to the base tool 120. The base tool 120 may have a different thermal expansion growth rate 129 than the thermal expansion growth rate 131 of the composite assembly 112. The thermal expansion growth rate 129 of the base tool 120 may be larger than that of the thermal expansion growth rate 131 of the composite assembly 112. In other embodiments, the thermal expansion growth rates 129 and 131 of the base tool 120 and the composite assembly 112 may vary.

The engagement fittings 124, 126, and 127 may be U-shaped. In other embodiments, the engagement fittings 124, 126, and 127 may be of any number, shape, size, and/or material. The growth control apparatus 122 may comprise a plurality of growth control members 130 and 132 which may be substantially smaller than the base tool 120. The growth control apparatus 122, including growth control members 130 and 132 may be made of Invar and/or another material which has a thermal expansion growth rate 138 which is substantially similar and/or identical to the thermal expansion growth rate 131 of the composite assembly 112 but different than the thermal expansion growth rate 129 of the base tool 120. In one embodiment, the thermal expansion growth rates 138 and 131 of the growth control apparatus 122 and the composite assembly 112 may be less than the thermal expansion growth rate 129 of the base tool 120. In other embodiments, the growth control apparatus 122 may be made of varying materials and/or have a varying thermal expansion growth rate 138 relative to the thermal expansion growth rate 129 of the base tool 120. The growth control members 130 and 132 may be disposed at opposite ends of the base tool 120 in parallel formation.

Growth control members 130 and 132 may be attached using pins, clips, and/or other attachment mechanisms at center sections 142 and 144 to base tool 120. The ends 141 and 143 of the growth control members 130 and 132 may not be pinned to base tool 120. As a result, the ends 141 and 143 of the growth control members 130 and 132 may be adapted to grow/move relative to base tool 120. The engagement fittings 124, 126, and 127 may be attached using pins, clips, and/or other attachment mechanisms to the growth control members 130 and 132 but not to the base tool 120. In such manner, the engagement fittings 124, 126, and 127 may be adapted to move relative to the base tool 120 with movement of the growth control members 130 and 132 upon which they are disposed. The engagement fittings 124, 126, and 127 may be attached using pins, clips, and/or other mechanisms to the composite parts 115 of the composite assembly 112.

Figure 5:
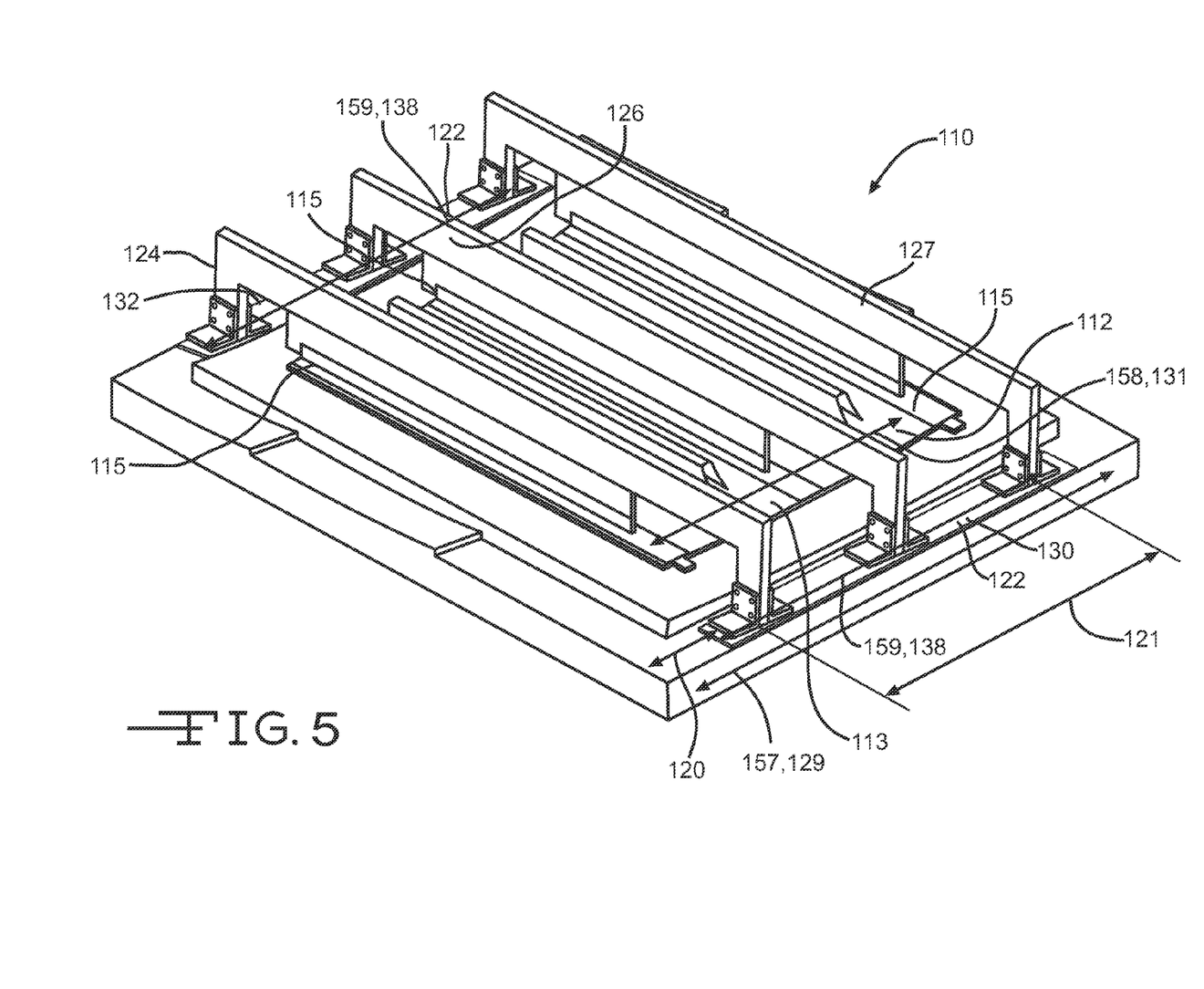
FIG. 5 shows a perspective view of the apparatus of FIG. 4 after the composite assembly has been cured at an elevated curing temperature.

FIG. 5 shows a perspective view of the apparatus 110 of FIG. 4 after the composite assembly 112 has been cured at an elevated curing temperature during which the composite parts 115 may have cured/bonded to the composite part 113 of the composite assembly 112. Due to the elevated curing temperature, the base tool 120 may have expanded along direction 157 in conjunction with the thermal expansion growth rate 129 of the base tool 120. Similarly, the composite assembly 112 may have expanded in direction 158 in conjunction with the thermal expansion growth rate 131 of the composite assembly 112. Likewise, the growth control members 130 and 132 may have expanded in direction 159 in conjunction with the thermal expansion growth rate 138 of the growth control members 130 and 132.

Due to the similarity and/or identity of the thermal expansion growth rates 131 and 138 of the composite assembly 112 and the growth control apparatus 122, the composite assembly 112 may have expanded substantially the same amount in direction 158 as the growth control members 130 and 132 in direction 159, but may have expanded a varied amount relative to base tool 120 in direction 157. As a result of the similarity and/or identity of the thermal expansion growth rates 131 and 138 of the composite assembly 112 and the growth control apparatus 122, the design dimension 121 of the composite assembly 112 extending between the end two composite parts 115 may have grown in direction 158 substantially the same amount as the growth control members 130 and 132 in direction 159. The engagement fittings 124, 126, and 127 attached to the growth control members 130 and 132 but not attached to the base tool 120 may have moved with the growth control members 130 and 132 in direction 159, and therefore stayed aligned with the composite parts 115 which may have moved with the composite part 113 of the composite assembly 112 in direction 158. In such manner, the cured alignment of the engagement fittings 124, 126, and 127, the composite parts 115, and the composite part 113 may remain substantially the same and/or identical to their pre-cure alignment.

By altering the pre-cured design dimension 121 of FIG. 4, and/or the thermal expansion growth rates 131 and 138 of the composite assembly 112 and the growth control apparatus 122 relative to thermal expansion growth rate 129 of the base tool 120, the growth of the growth control apparatus 122 in direction 159 may be pre-determined and may produce a pre-determined, cured design dimension 121.

Figure 6:
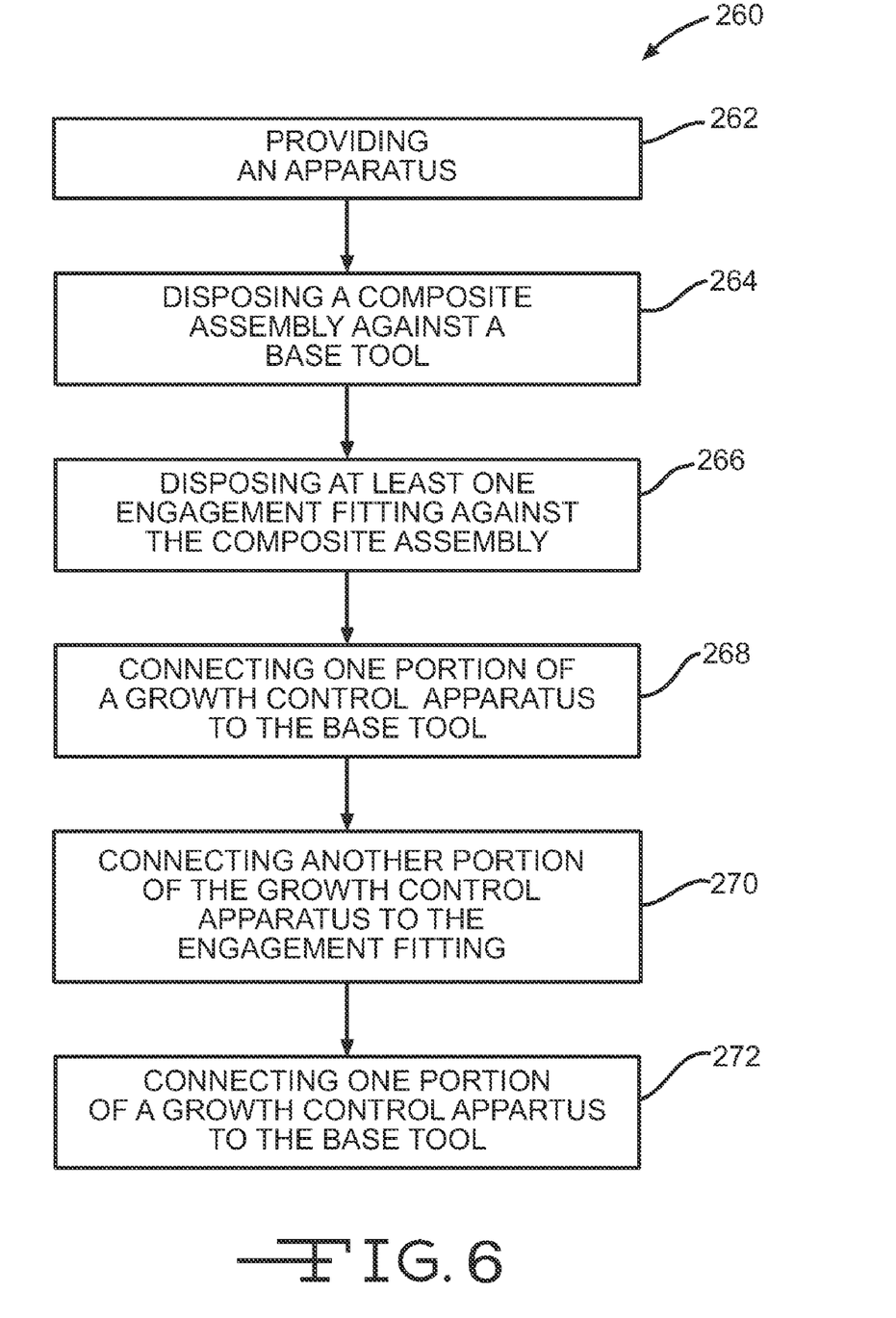
FIG. 6 shows a flowchart of one embodiment of a method for curing a composite assembly.

FIG. 6 shows a flowchart of one embodiment of a method 260 for curing a composite assembly 12/112. The composite assembly 12/112 may comprise any of the embodiments disclosed herein. In one step 262, an apparatus 10/110 may be provided. The provided apparatus 10/110 may comprise a base tool 20/120, a growth control apparatus 22/122, and at least one engagement fitting 24/26/124/126/127. The base tool 20/120, growth control apparatus 22/122, and the at least one engagement fitting 24/26/124/126/127 may comprise any of the embodiments disclosed herein. The growth control apparatus 22/122 may have a different thermal expansion growth rate 38/138 than the thermal expansion growth rate 29/129 of the base tool 20/120. In one embodiment, the growth control apparatus 122 may comprise a plurality of growth control members 130/132 disposed at opposite ends of the base tool 120 in parallel formation. In other embodiments, the formation may be non-parallel. In another embodiment, the growth control apparatus 22 may comprise a plurality of growth control members 30, 32, 34, and 36 disposed in offset formation. The at least one engagement fitting 24/26/124/126/127 may be moveable relative to the base tool 20/120.

In another step 264, a composite assembly 12/112 may be disposed against the base tool 20/120. The composite assembly 12/112 may have a different thermal expansion growth rate 31/131 than the thermal expansion growth rate 29/129 of the base tool 20/120. In still another step 266, the at least one engagement fitting 24/26/124/126/127 may be disposed against the composite assembly 12/112. In yet another step 168, one portion 42/44/46/48/142/144 of the growth control apparatus 22/122 may be connected to the base tool 20/120. In one embodiment, step 268 may comprise attaching one end 42/44/46/48 of each growth control member 30/32/34/36 to the base tool 20 at locations offset from a center location 45 of the composite assembly 12. The thermal expansion growth rate 138 of the growth control apparatus 122 may be substantially similar and/or identical to the thermal expansion growth rate 131 of the composite assembly 112. In another embodiment, the thermal expansion growth rate 38 of the growth control apparatus 22 may be different than the thermal expansion growth rate 31 of the composite assembly 12.

In an additional step 270, another portion of the growth control apparatus 22/122 may be connected to the at least one engagement fitting 24/26/124/126/127 without connecting the another portion to the base tool 20/120. Still another step 272 may comprise curing the composite assembly 12/122 to grow the growth control apparatus 22/122 a pre-determined amount to produce a cured composite assembly 12/122 of a pre-determined design dimension 21/121. During step 272, the at least one engagement fitting 24/26/124/126/127 may move relative to the base tool 20/120.

One or more embodiments of the disclosure may reduce one or more problems of one or more of the existing apparatus and/or methods for curing a composite assembly. For instance, one or more embodiments of the disclosure may allow for more precise dimensional control of co-cured and/or co-bonded composite assemblies; may allow for the tailoring of the thermal growth characteristics of the cure tooling; may save cost by allowing for the larger base tool to be made of a more inexpensive material than the smaller growth control apparatus; may allow for the base tool to be made of a different material than the growth control apparatus with varying properties; and/or may reduce one or more other types of problems of one or more of the existing apparatus and/or methods.

It should be understood, of course, that the foregoing relates to exemplary embodiments of the disclosure and that modifications may be made without departing from the spirit and scope of the disclosure as set forth in the following claims.

The invention claimed is:

1. A method for curing a composite assembly comprising:
attaching elongated growth control members to a composite assembly disposed against a side of a base tool, the elongated growth control members fixedly attached at attachment locations to the side of the base tool and extending from the attachment locations along the side of the base tool towards ends of the side of the base tool; and
curing the composite assembly attached to the elongated growth control members thereby growing the elongated growth control members relative to the side of the base tool.

2. The method of claim 1 wherein the engagement fittings are fixedly attached to the elongated growth control members.

3. The method of claim 2 wherein the attaching further comprises attaching the engagement fittings to the composite assembly disposed against the side of the base tool.

4. The method of claim 3 wherein the curing further comprises curing the composite assembly attached to the engagement fittings thereby growing the elongated growth control members and moving the engagement fittings relative to the side of the base tool.

5. The method of claim 1 wherein the elongated growth control members have a different thermal expansion growth rate than the base tool.

6. The method of claim 1 wherein the composite assembly has a thermal expansion growth rate which is different than thermal expansion growth rates of both the base tool and the elongated growth control members.

7. The method of claim 1 wherein the composite assembly has a thermal expansion growth rate which is different than the thermal expansion growth rate of the base tool, but substantially similar or identical to the thermal expansion growth rate of the elongated growth control members.

8. The method of claim 1 wherein the elongated growth control members are fixedly attached at center segments of the side of the base tool.

9. The method of claim 1 wherein the elongated growth control-members, at locations where they are attached to the composite assembly, are not connected to the side of the base tool.

10. The method of claim 1 wherein the elongated growth control members are disposed along the side of the base tool in parallel formation.

11. The method of claim 1 wherein a center section of each elongated growth control member is fixedly attached to the side of the base tool.

12. The method of claim 11 wherein opposite ends of each elongated growth control member are attached to the composite assembly but are not connected to the side of the base tool.

13. The method of claim 1 wherein the attachment locations are disposed on opposite sides of a center-line in-between ends of the composite assembly.

14. The method of claim 13 wherein an end of each elongated growth control member is fixedly attached to the composite assembly but is not connected to the side of the base tool.

15. The method of 1 wherein the side of the base tool comprises a curved portion.

16. The method of claim 1 wherein the composite assembly comprises a composite tube.

17. The method of claim 1 wherein the elongated growth control members comprise elongated bars.

18. A method for curing a composite assembly comprising:
attaching engagement fittings to a composite assembly disposed against a side of a base tool, elongated growth control members fixedly attached at attachment locations to the side of the base tool and extending from the attachment locations along the side of the base tool towards opposite ends of the side of the base tool, the engagement fittings fixedly attached to the elongated growth control members; and
curing the composite assembly attached to the engagement fittings thereby growing the elongated growth control members and moving the engagement fittings relative to the side of the base tool.

19. The method of claim 18 wherein the elongated growth control members have a different thermal expansion growth rate than the base tool.

20. The method of claim 18 wherein the elongated growth control members comprise elongated bars.

21. The method of claim 18 wherein the elongated growth control members are fixedly attached at center segments of the side of the base tool and extend, from the center segments, along the side of the base tool to opposite end segments of the side of the base tool.

22. The method of claim 18 wherein the composite assembly has a thermal expansion growth rate which is different than thermal expansion growth rates of both the base tool and the elongated growth control members.

23. The method of claim 18 wherein the composite assembly has a thermal expansion growth rate which is different than the thermal expansion growth rate of the base tool, but substantially similar or identical to the thermal expansion growth rate of the elongated growth control members.

24. The method of claim 18 wherein the elongated growth control-members, at locations where they are fixedly attached to the engagement fittings, are not connected to the side of the base tool.

25. The method of claim 18 wherein the elongated growth control members are disposed along the side of the base tool in parallel formation.

26. The method of claim 18 wherein a center section of each elongated growth control member is fixedly attached to the side of the base tool.

27. The method of claim 26 wherein opposite ends of each elongated growth control member are fixedly attached to the engagement fittings but are not connected to the side of the base tool.

28. The method of claim 18 wherein the attachment locations are disposed on opposite sides of a center-line in-between the engagement fittings.

29. The method of claim 28 wherein an end of each elongated growth control member is fixedly attached to one of the engagement fittings but is not connected to the side of the base tool.

30. The method of 18 wherein the side of the base tool comprises a curved portion.

31. The method of claim 18 wherein the composite assembly comprises a composite tube.

32. The method of claim 31 wherein a plurality of end fittings are attached to opposed ends of the composite tube, and the engagement fittings are fixedly attached to the end fittings.

* * * * *